Feb. 6, 1934.　　　　R. J. NORTON　　　　1,946,101
BRAKE TESTING STRUCTURE
Filed March 25, 1929　　3 Sheets-Sheet 1
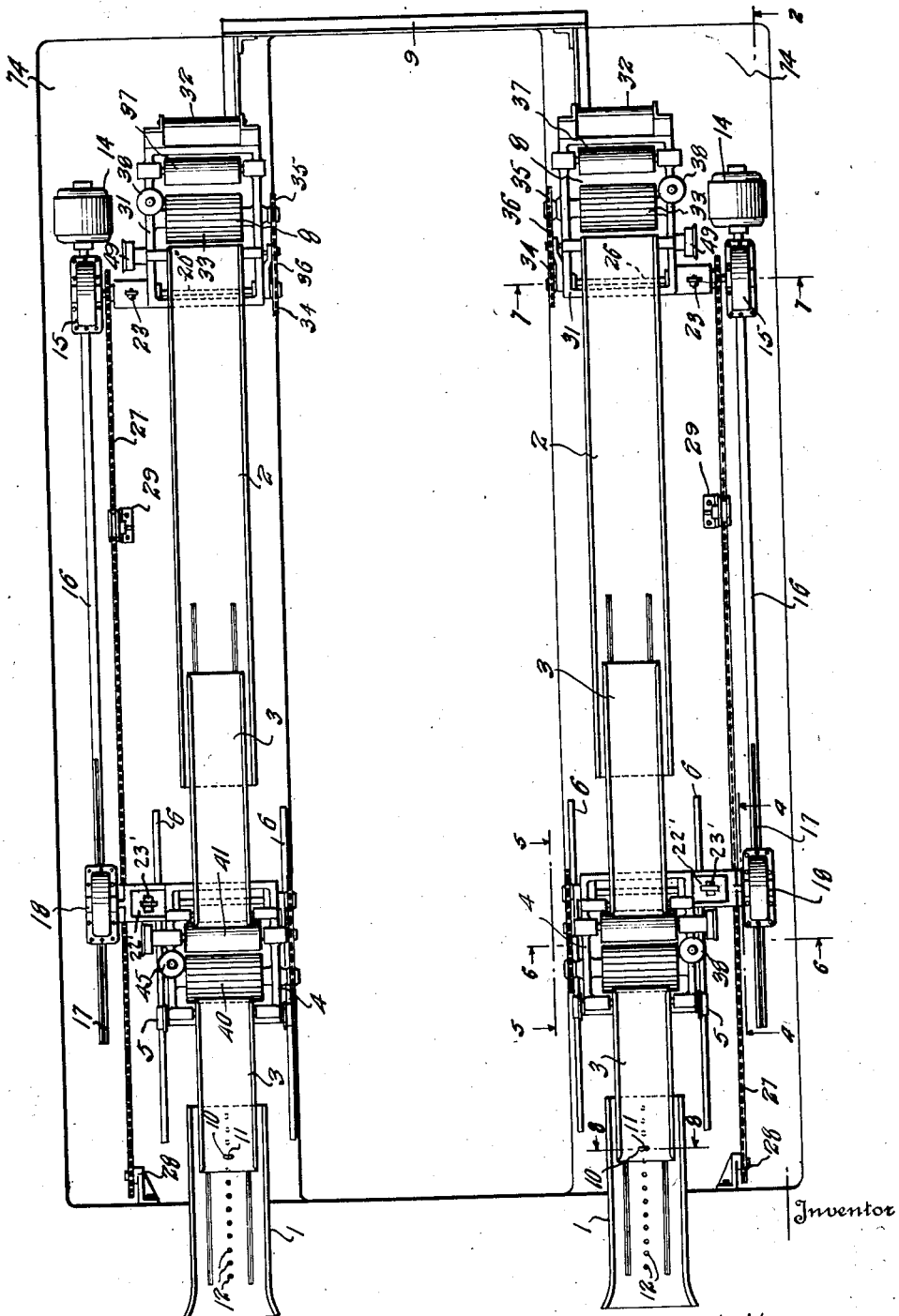
Inventor
RAYMOND J. NORTON
By Semmes & Semmes
Attorneys Feb. 6, 1934.        R. J. NORTON         1,946,101
                  BRAKE TESTING STRUCTURE
              Filed March 25, 1929      3 Sheets-Sheet 2
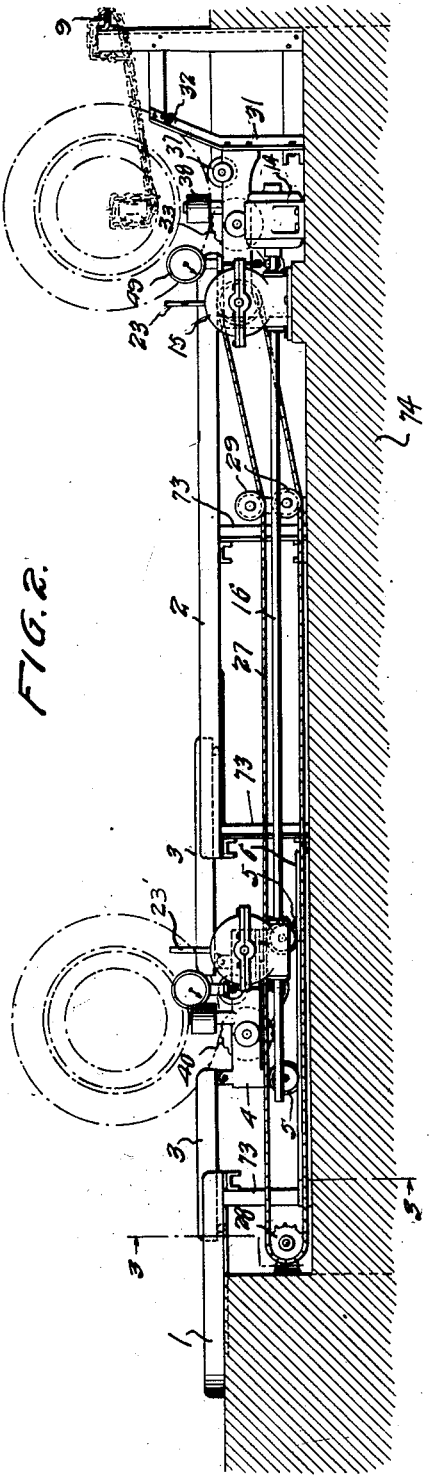
Inventor
RAYMOND J. NORTON
By Semmes & Semmes
Attorneys

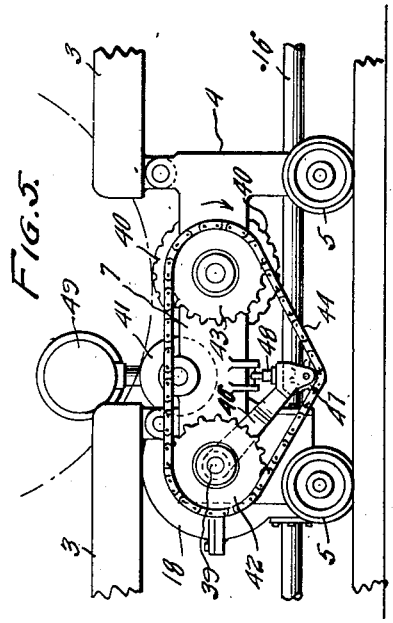

Patented Feb. 6, 1934

1,946,101

UNITED STATES PATENT OFFICE 1,946,101

BRAKE TESTING STRUCTURE

Raymond J. Norton, Washington, D. C., assignor, by mesne assignments, to Bendix-Cowdrey Brake Tester, Inc., New York, N. Y., a corporation of Delaware Application March 25, 1929. Serial No. 349,793

4 Claims. (Cl. 73—51)

This invention relates to brake testing devices and pertains more specifically to testing apparatus for automotive vehicles.

In the past a number of mechanisms for testing the brakes on automotive vehicles have been proposed. Many of these are adapted to test only one wheel at a time and hence necessitate a considerable expenditure of time to complete the testing operation. Others are constructed to test two or more wheels simultaneously, but are so designed as to preclude a facile adjustment to variant wheel base lengths and ready accessibility to the several brakes.

It is an object of the present invention to provide a testing apparatus which simultaneously indicates the retardation of each of the wheel brakes.

Another object is to provide a testing apparatus for a vehicle having brakes on four wheels, which is readily adjustable to accommodate differential wheel bases.

Yet another object is to provide a testing apparatus of the class described, which is so designed as to provide a clear space between the wheels on each side of the vehicle.

A further object is to provide an apparatus which is adjustable to varying wheel bases, and which is operable from a single source of power.

With these and other important and related objects in view the invention contemplates the provision of a testing assembly which includes testing units for the front and rear wheels in conjunction with a source of power which is adapted not only to actuate a plurality of the units, but also to relatively displace the units so as to accommodate cars of differential wheel bases.

In order to render the invention readily understood, a preferred modification is shown in the accompanying drawings in which:

Figure 1 is a plan view of the tester assemblage.

Figure 2 is a cross section on line 2—2 of Figure 1.

Figure 3 is a longitudinal section on line 3—3 of Figure 2.

Figure 4 is a transverse section taken on line 4—4 of Figure 1.

Figure 5 is a sectional view of the drive mechanism.

Figure 6 is a detailed elevation taken substantially on line 6—6 of Fig. 1.

Figure 7 is a view similar to Figure 6 taken on line 7—7 of Fig. 1.

Figure 8 is a detailed view taken on line 8—8 of Figure 1.

As shown in the drawings, the apparatus comprises a pair of parallel trackways 1, which are adapted to be set in a pit or mounted upon suitable supports and provided with a suitable ramp. The trackways may be channel shaped in cross sections and serve to receive the wheels of the vehicle to be tested.

Positioned near one end of the trackway 1 is a second set of permanent trackways 2. It will be noted that the trackways 2 are aligned with and spaced from the trackways 1. Fitting in and bridging the space between the tracks 1 and 2 are the ways 3, which are secured to and movable with the carriage 4. If desired, the lower edges of each of the ways 3 may be provided with antifriction devices 72 to diminish the sliding friction between them and the permanent ways. All of the permanent trackways are supported by a frame structure 73, which, together with the tracks 6, is fixed to the base 74.

The carriage 4 is provided at its base with a plurality of rollers or wheels 5, which are mounted on the tracks or guideways 6. It will be seen that if a force is properly applied to the carriage, this may be displaced longitudinally and will carry with it the ways or runners 3. These latter will slide upon the permanent ways 1 and 2 and will thus maintain in effect a continuous trackway for the reception and passage of a vehicle wheel on and off the carriage.

Mounted on each carriage is a brake testing device designated generally by the numeral 7. As will be described more in detail hereinafter, this is driven by a motor, through a flexible driving connection and is adapted to rotate a wheel against the resistance of its brake. The reaction or resistance set up by the brake is utilized to vary the tension on the driving mechanism and this variance is utilized to actuate a brake indicating device.

Positioned near the front end of each trackway 1 is a second testing device 8, comparable in most respects to that mounted on the movable carriage 4. As has been indicated hereinbefore, one object of the present invention is to provide a testing unit for four wheel brakes which is adjustable longitudinally to conform to cars of different wheel bases. In the present device, as will have been appreciated, this adjustment may be made by moving the carriage 4 longitudinally of the frame. The carriage 4 is designed to receive the rear wheels of the vehicle, but it is obvious that, if desired, the testing units for the rear wheels may be fixed in position and the testing units of the front wheels made displaceable, as by mounting them on movable carriages.

Since the adjustment may readily be made by moving only one set of testers at one end of the car, I prefer to permanently fix the tester units 8 with respect to the frame. As the units 8 are relatively immovable, the trackway 1 may be closely juxtaposed thereto so that the front wheels of the vehicle may pass over these ways and directly onto the testing units.

It is desirable for obvious reasons to anchor the car to the testing device during the testing operation. This may readily be done by securing the car in any desired manner to the frame cross member 9. Where it is planned to move the car forwardly on the trackways 1 and back it off after the test is completed, this cross member may comprise a permanent member which projects upwardly of the track.

The movable carriages are usually positioned near the forward end of the assemblage, that is, in that position which will accommodate a car of the shortest wheel base. When a car is to be tested, it is moved onto the trackway until the front wheels rest on the driving rollers of the forward testing machines. If the car has a wheel base which is longer than the distance between the front and rear set of testers, the latter may be moved rearwardly until its rollers are in operative position beneath the rear driving wheels. The carriage may be locked in this position by the pins 10, which are received in the aligned apertures 11 and 12 of the trackways 3 and 1, respectively.

To effect this displacement of the carriage a number of specific mechanisms may be employed. If desired, the rear or driving wheels of the vehicle may be rotated by operation of the vehicle motor. These wheels frictionally engage the trackway 3 and will rearwardly displace the latter and the connected carriage. When the carriage is moved into operative or testing position, the driving wheels may be stopped and the carriage then locked.

While the carriage may be displaced in the manner described, it is preferable to drive it from a source of power which is independent of the vehicle motor. In this way the brakes may be tested while the engine motor is being repaired. To accomplish this the carriage is associated with a driving mechanism which is actuated by the same motor which is used for testing the brakes on the wheels. In this manner a single source of power is utilized to effect the preliminary adjustment as well as the actual brake test.

In one modification each carriage may be displaced by a motor positioned at one side of the testing machine. As shown, the motor 14 is mounted adjacent the trackway and preferably on the outside. This positioning of the parts provides a clear space within the confines of the track structure and permits an operator to carry out any mechanical adjustments either on the brakes or other portions of the car without being subjected to the discomforts incident to the presence of cross shafts, projecting members, etc.

Each motor 14 has its shaft directly connected with a reduction gearing encased in a housing 15. A shaft 16, forming a continuation of the shaft of motor 14, extends substantially the length of the whole testing structure and is provided adjacent its free end with grooves or splines 17, by means of which the shaft is slidably connected with a driving element of a reduction gearing encased in housing 18. This construction permits power to be supplied to the testing devices associated with the adjustable carriages 4 in all positions of adjustment.

The reduction gearing may be of any desired type and ratio; however, for purposes of illustration, it is shown to be of the worm type, in which a worm 19 is associated with the driving shaft, and a gear 20 with a driven shaft 21. As shown in Figures 1 and 7, driven shaft 21 has a clutch element slidably keyed thereto. This element is provided with a groove, with which is associated a shifting lever 23, by means of which element 22 may be slided into fixed engagement with either sprocket 24 or clutch collar 25. The latter is fixed to shaft 26 so as to rotate therewith. Sprocket 24 is rotatably mounted on shaft 21, but, when the lever 23 is shifted so that the dogs on the clutching element 22 engage with those carried by the sprocket, it will rotate with shaft 21.

A flexible drive, shown as chain 27, passes over sprocket 24 and over sprocket 28 mounted at the other end of the testing structure. This structure is clearly illustrated in Figure 2. Guide rollers 29 are associated with the chain to position it for moving the carriage 4. The carriage 4 has a clevis 30 mounted thereon, which is connected with chain 27 in such a manner that the carriage 4 moves with the chain.

Thus, when it is desired to move the carriage 4, lever 23 is shifted to connect sprocket 24 with shaft 21, and the motor 14 is operated to move the carriage to the desired location, after which the motor is stopped and the sprocket 24 disconnected from the shaft 21. The carriage 4 may then be locked in position by means of the pin 10, or by other means suitable for the purpose.

The testing unit 8 is mounted on a frame structure 31, which is provided with a bumper 32 to prevent a vehicle from overrunning the testing structure. Frame 31 is provided with bearings journaling shaft 26, which abuts shaft 21 and carries the clutching collar 25. A wheel rotating roller 33, corrugated to increase the frictional engagement with a vehicle tire, is rotatably mounted on the frame 31. Shaft 26 and the shaft to which roller 33 is fixed, carry sprockets 34 and 35, respectively, over which a driving chain 36 passes. An idling, wheel positioning roller 37 is spaced from roller 33 to properly position the vehicle wheel thereon. The frame 31 also carries a vertically positioned guide roller 38 to prevent the vehicle wheel from slipping off the wheel rotating roller.

Movable carriage 4 rotatably supports a shaft 39 associated with the speed reduction device 18, and vehicle wheel rotating, wheel positioning and guide rollers 40, 41 and 45 respectively. A clutch or coupling may be provided for detachably connecting shaft 39 with the reduction gear 18. Such a clutch is indicated at 22', and is provided with a shifting lever 23'. Shaft 39 and the shaft of the wheel rotating roller are fitted with sprockets 42 and 43, over which passes a chain 44, by means of which rotary motion of shaft 39 is transmitted to roller 40.

It will be appreciated that when a retarding force is applied to the wheel rotating roller, the tension in the driving chain 44 will be correspondingly increased; consequently the tension in the flexible driving element, which is a function of the retarding force, can be measured as indicative of the retarding force. The tension may be measured by various means, one form of which is shown in the accompanying drawings.

The structure for measuring the tension in the flexible driving element will be described in connection with the movable testing unit 4, but I wish it to be clearly understood that the same type of structure is associated with each of the four testing units.

As shown in the drawings, an arm 46 is pivotally mounted on shaft 39. The free end of this arm is bifurcated and supports a shaft on which is mounted an idling roller or sprocket 47, adapted to engage the portion of chain 44 which is under tension, when transmitting power from shaft 39 to roller 40. The upper portion of the bifurcated end of the arm 46 is equipped with an adjustable bearing member 48. As the tension in chain 44 increases, there will be a tendency for the portion of the chain under tension to straighten out. This tendency will effect an upward movement of the bifurcated end of arm 46.

The force tending to straighten the portion of chain 44 under tension is measured by a load indicating instrument 49. An actuating rod 50 is associated with the instrument 49 and is pivotally connected with a balance beam 51. The free end of the beam 51 is provided with a knife edge 52, which engages the bearing member 48. Knife edge 53, carried by the carriage, serves as a fulcrum for the beam 51. From the foregoing description it will be appreciated that any tendency of the portion of chain 44 under tension to straighten will be transmitted through the beam structure to the indicating instrument 49.

Since the force exerted on the knife edge carried by lever 51 is a function of the tension in the chain 44, which in turn is a function of the retarding force applied to roller 40 by applying the brake to a vehicle wheel supported thereon, the load indicated on the dial of instrument 49 may be used to compute the torque and brake resistance of the brake carried by the vehicle wheel in terms of other physical quantities. In the preferred embodiment of this invention the indicating instrument is modified somewhat; that is, the dial is calibrated so that the pointer directly indicates brake resistance in terms of retarding torque.

These calibrations may be made, as will be understood, by measuring the torque of the testing unit when operated against varying torques imposed and indicated by a suitable prony brake or other dynamometer. Since the reading on the dial of the instrument is proportionate the increased resistance exerted by the brake application, the calibration may be easily made. The actual calibration of a given unit will, of course, depend upon the ratio of the portions of the balance beam, the angularity of the several portions of the chain under tension, and other conditions.

The mode of operation of the tester will have been appreciated from the foregoing description. A vehicle, the brakes of which are to be tested, is run onto the trackways 2 until the front wheels engage with the wheel rotating rollers 33 carried by the testing units 8. The chassis of the vehicle is secured to the cross-bar 9 by means of a chain or other device such as is shown in Figure 2.

The levers 23 are shifted so that the sprockets 24 rotate with shaft 21, and shafts 39 of units 7 are disconnected from the reduction gearing 18. Motors 14 are then operated, and motion is transmitted through speed reduction devices 15, sprockets 24 to chains 27, which move the carriages 4 to a position at which the wheel rotating rollers 40 will engage with the rear wheels of the vehicle to be tested. Pins 10 are then secured in place to lock trackways 3 and carriages 4 in the adjusted position. After adjustments have been made to fit the particular car to be tested, levers 23 are shifted to disengage sprockets 24 from shafts 21 and to effect engagement between clutch elements 22, carried by shafts 21, and the clutch collar 25, which are secured to shafts 26 of the testing units 8. Engagement is also effected between shafts 16 and the shafts 39 carried by the adjustable carriages 4.

After these changes have been made, motors 14 are energized and rotation imparted to the shafts of motors 14 will be transmitted by the hereinbefore described mechanism to the shafts 26 of the testing units 8 and shafts 39 of the testing units 7. As the brakes are applied to the wheels of the vehicle being tested, the tension in the chains 44 will be increased. This increase in the tension of chains 44 will have a tendency to move the bifurcated ends of arms 46 upwardly. The upward movement of the ends of arms 46 will be transmitted through the balance beam 51 and the actuating rods of indicating instruments 49 to these instruments. The force tending to move the end of the arm 46 upwardly will be recorded directly on the dials of the instruments 49 in terms of retarding torque.

Retardation effects will be indicated directly on the indicating devices up to a point where the vehicle wheels slip with respect to the wheel rotating rollers. The brake efficiency of each wheel being tested may be determined independently of the other wheels, and, due to the space afforded by the present construction, a workman may adjust the brakes of the vehicle while the same are being tested, in order to equalize them and to secure the maximum braking efficiency.

When used for operating the testing units, the motor or motors need run in only one direction; however, when used for shifting the movable carriages, the motors employed may be of the reversible type.

In the foregoing description reference has been made to several clutches or couplings shown in the drawings. As illustrated, these clutches are provided with portions adapted to engage members to be rotated therewith; however, it is within the concept of the present invention to employ clutches of any other suitable type.

As shown in the drawings, power is transmitted in several instances by chains. I wish it to be clearly understood, however, that other flexible means may be employed in applying the concept of this invention to practical structure.

For purposes of convenience the construction of only one side of each of the brake testers contemplated by this invention has been described in detail, but I wish it to be clearly understood that each side of the complete testing structure is similar to the other; similar parts of each side have been indicated by similar reference numerals.

While I have shown and described the preferred embodiment of my invention, I wish it to be understood that I do not confine myself to the precise details of construction herein set forth, by way of illustration, as it is apparent that many changes and variations may be made therein by those skilled in the art without departing from the spirit of the invention or exceeding the scope of the appended claims.

I claim:

1. Brake testing apparatus comprising a plurality of brake testing units, those for testing the brakes at one end of a vehicle being fixed, those for testing the brakes at the other end of the vehicle being movable, a source of power for operating the units associated with one side of the vehicle, and for adjusting the movable unit and a source of power for similarly operating the units associated with the other side of the vehicle.

2. Brake testing apparatus comprising a plurality of brake testing units, those for testing the brakes at one end of a vehicle being fixed, those for testing the brakes at the other end of the vehicle being movable, a source of power for operating the units associated with one side of the vehicle, and for adjusting the movable unit and a source of power for similarly operating the units associated with the other side of the vehicle, the adjustment of said movable units being effected by flexible power transmitting means.

3. Brake testing mechanism comprising a pit, testing units for front and rear vehicle wheels positioned on each side of the pit, one unit on each side being movable, a source of power on each side of the pit, a splined shaft associated with each source of power and means connected with said shafts for driving the testing units and means associated with the sources of power for shifting the movable units.

4. Brake testing mechanism comprising a pit, testing units for front and rear vehicle wheels positioned on each side of the pit, one unit on each side being movable, a source of power on each side of the pit, a splined shaft associated with each source of power and means connected with said shafts for driving the testing units and flexible means secured to the movable units and detachably connected with the source of power for shifting the movable units.

RAYMOND J. NORTON.